United States Patent
Yonekura et al.

(10) Patent No.: US 10,955,366 B2
(45) Date of Patent: Mar. 23, 2021

(54) CRYSTAL STRUCTURE ANALYSIS SYSTEM AND CRYSTAL STRUCTURE ANALYSIS METHOD

(71) Applicants: RIKEN, Wako (JP); JEOL Ltd., Tokyo (JP)

(72) Inventors: Koji Yonekura, Wako (JP); Yusuke Nishiyama, Tokyo (JP)

(73) Assignees: JEOL Ltd., Tokyo (JP); RIKEN, Wako (JP)

(*) Notice: Subject to any disclaimer, the term of this patent is extended or adjusted under 35 U.S.C. 154(b) by 6 days.

(21) Appl. No.: 16/456,166

(22) Filed: Jun. 28, 2019

(65) Prior Publication Data
US 2020/0003710 A1    Jan. 2, 2020

(30) Foreign Application Priority Data
Jun. 29, 2018 (JP) .............................. JP2018-123904

(51) Int. Cl.
*G01N 23/20058* (2018.01)
*G01N 24/08* (2006.01)

(52) U.S. Cl.
CPC ..... *G01N 23/20058* (2013.01); *G01N 24/081* (2013.01); *G01N 2223/604* (2013.01)

(58) Field of Classification Search
CPC ....... G01N 23/20058; G01N 2223/604; G01N 24/081
See application file for complete search history.

(56) References Cited

U.S. PATENT DOCUMENTS

| 2011/0220796 A1* | 9/2011 | Nicolopoulos ..... H01J 37/2955 250/307 |
| 2015/0010132 A1* | 1/2015 | Kimura .............. G01N 23/2005 378/75 |

FOREIGN PATENT DOCUMENTS

| JP | 2005250721 A | 9/2005 |
| WO | 2015072982 A1 | 5/2015 |

OTHER PUBLICATIONS

Tetsuo et al., Solid-state NMR meets electron diffraction: determination of crystalline polymorphs of small organic microcrystalline samples; Acta Crystallographica Section C Structural Chemistry, Feb. 24, 2017, vol. 73; pp. 219-228.
Extended European Search Report issued in EP 19182622.1 dated Jan. 8, 2020.

* cited by examiner

*Primary Examiner* — Gregory H Curran
(74) *Attorney, Agent, or Firm* — The Webb Law Firm

(57) ABSTRACT

An electron diffraction apparatus measures an overall structure of a crystal of a specimen by electron diffraction. An NMR apparatus measures a local structure of the crystal by NMR measurement. An analysis apparatus combines the overall structure and the local structure to specify a structure of the crystal.

14 Claims, 6 Drawing Sheets

CRYSTAL STRUCTURE ANALYSIS SYSTEM AND CRYSTAL STRUCTURE ANALYSIS METHOD

CROSS-REFERENCE TO RELATED APPLICATION

This application claims priority to Japanese Patent Application No. 2018-123904 filed Jun. 29, 2018, the disclosure of which is hereby incorporated by reference in its entirety.

BACKGROUND OF THE INVENTION

Field of the Invention

The present disclosure relates to a system and a method for analyzing a crystal structure of a specimen.

Description of Related Art

When a crystal structure is analyzed, if a monocrystal having a size of about 10~100 µm is obtained, generally, the crystal structure is specified by a monocrystalline X-ray diffraction method. In the monocrystalline X-ray diffraction method, diffraction images are acquired while an angle of incidence of an X-ray to the specimen is changed, to observe a three-dimensional reciprocal lattice space. From a Fourier map in a real space, a molecular replacement method or a direct method is applied, to thereby obtain the reciprocal lattice space. Even for a microcrystal having a size of 1 µm or smaller, which is too small for using the monocrystalline X-ray diffraction method, if a microcrystal powder specimen can be obtained which does not contain impurities, the crystal structure may be specified by a powder X-ray diffraction method.

In any of these cases, a physical quantity obtained by measurement is a diffraction pattern, and position information of the reciprocal lattice space is not obtained. Thus, a structure analysis by the molecular replacement method, the direct method, or the like is necessary. In the monocrystalline X-ray diffraction method, because an intensity of a three-dimensional reciprocal lattice space is obtained as three-dimensional data, a three-dimensional structure in the real space can be relatively easily obtained. On the other hand, in the powder X-ray, only a projection onto a 2θ axis can be obtained. Therefore, in the powder X-ray diffraction method, as compared to the monocrystalline X-ray diffraction, a larger number of suppositions are necessary for the structure analysis, and, as a result, there may be cases where the structure is not specified. In addition, when the powder specimen contains impurities, the structure analysis is substantially impossible with the powder specimen. Moreover, in any of these methods, a scattering intensity from a hydrogen atom having a low electron density is weak, and thus, observation of the hydrogen atom is not easy. A position of the hydrogen atom can be determined by neutron diffraction, but this requires a monocrystal which is further larger than the monocrystal used in the monocrystalline X-ray diffraction method. Further, in order to reduce the background, use of deuterium may become necessary.

JP 2005-250721 A discloses an apparatus which uses protein three-dimensional shape information obtained by a transmission electron microscope, to search a protein three-dimensional shape database for proteins having similar functions.

Known methods of analyzing the crystal structure include the monocrystalline X-ray diffraction method, the powder X-ray diffraction method, a monocrystalline neutron diffraction method, an electron diffraction method, and a solid-state Nuclear Magnetic Resonance (NMR) measurement method.

In order to analyze the crystal structure by the monocrystalline X-ray diffraction method, as described above, a large monocrystal having a size of about 10~100 µm must be used, and, when only a monocrystal having a size of about 1 µm can be obtained, the crystal structure cannot be analyzed. In addition, there may be cases where it is difficult to distinguish elements having atomic numbers that are close to each other. Further, it is difficult to observe elements such as the hydrogen atom, which is light and which has a low electron density.

In order to analyze the crystal structure by the powder X-ray diffraction method, as described above, it is necessary to use pure microcrystalline powder having no impurity. Thus, it is not possible to analyze the crystal structure of a specimen including impurities, such as a tablet. Moreover, when a number of degrees of freedom of the molecule is too large, the crystal structure cannot be analyzed. Further, it is difficult to distinguish elements having atomic numbers that are close to each other, and it is also difficult to observe elements such as the hydrogen atom, which is light and which has a low electron density.

In order to analyze the crystal structure by the monocrystalline neutron diffraction method, as described above, a monocrystal having a further larger size than the monocrystal used for the monocrystalline X-ray diffraction method must be used. Further, for reducing the background, deuterium replacement is necessary. In addition, a large-size neutron facility is necessary.

In the electron diffraction method, because an influence of multiple scattering is significant, a quality of the obtained diffraction pattern is inferior as compared to a quality of the diffraction pattern obtained by the X-ray diffraction method. Because of this, the position of the hydrogen atom cannot be specified, and it is difficult to distinguish elements having atomic numbers that are close to each other.

In the solid-state NMR measurement method, because a distance between atomic nuclei can be measured, in principle, the crystal structure can be analyzed. However, in general, it is difficult to specify an overall structure of the crystal. In addition, there may be cases where a specimen which is isomer-labelled becomes necessary.

In the above-described methods, in some cases, for example, the structure of the crystal having a size of 1 µm or smaller cannot be specified, the position of hydrogen cannot be specified, or elements having atomic numbers that are close to each other cannot be distinguished.

An advantage of the present disclosure lies in provision of a new analysis technology of a crystal structure, which uses the electron diffraction method and the NMR measurement method.

SUMMARY OF THE INVENTION

According to one aspect of the present disclosure, there is provided a crystal structure analysis system comprising: an electron diffraction apparatus that measures an overall structure of a crystal of a specimen by electron diffraction; an NMR apparatus that measures a local structure of the crystal by NMR measurement; and an analysis apparatus that combines the overall structure and the local structure to specify a structure of the crystal.

According to this structure, a local structure of the crystal which cannot be specified by electron diffraction is specified by NMR measurement, and an overall structure of the crystal which cannot be specified by the NMR measurement is specified by the electron diffraction. By combining the measurement results, it becomes possible to specify both the overall structure and the local structure of the crystal. The overall structure of the crystal is specified based on a diffraction pattern obtained by electron diffraction. The local structure of the crystal is specified based on an NMR parameter obtained by the NMR measurement. In addition, as will be described below, a quantum chemical calculation may be used. For example, the structure of the crystal may be specified by combining the electron diffraction, the NMR measurement, and the quantum chemical calculation.

According to another aspect of the present disclosure, the analysis apparatus may further optimize the structure of the crystal by applying a quantum chemical calculation to the overall structure, and may combine the optimized overall structure and the local structure.

According to another aspect of the present disclosure, the analysis apparatus may fit, in the combining process, an attribution of an atom X obtained by the NMR measurement to a potential map of the crystal obtained by the electron diffraction.

According to another aspect of the present disclosure, the NMR apparatus may measure a distance between an atom X and a hydrogen atom in the crystal by measuring a dipole interaction between the atom X and the hydrogen atom by the NMR measurement, and the analysis apparatus may specify, in the combining process, a position of the hydrogen atom in the overall structure based on the distance.

According to another aspect of the present disclosure, the NMR apparatus may execute a correlation measurement between an atom X and a hydrogen atom in the crystal by the NMR measurement, and, based on a result of the correlation measurement, the analysis apparatus may judge, in the combining process, whether or not the hydrogen atom is bonded to the atom X.

According to another aspect of the present disclosure, the analysis apparatus may further evaluate the overall structure measured by the electron diffraction, based on a chemical shift tensor or an isotropic chemical shift of the crystal obtained by the NMR measurement.

According to another aspect of the present disclosure, the analysis apparatus may evaluate the overall structure by comparing a chemical shift tensor or an isotropic chemical shift of the crystal calculated by a quantum chemical calculation and a chemical shift tensor or an isotropic chemical shift of the crystal obtained by the NMR measurement.

According to another aspect of the present disclosure, when a plurality of structures are deduced by the combining process, the analysis apparatus may evaluate the overall structure.

According to another aspect of the present disclosure, the analysis apparatus may further specify the overall structure by re-constructing a three-dimensional reciprocal lattice space of the crystal obtained by the electron diffraction.

According to another aspect of the present disclosure, the electron diffraction apparatus may execute measurement by the electron diffraction while the specimen is rotated.

According to another aspect of the present disclosure, the electron diffraction apparatus may execute measurement by the electron diffraction while the specimen is rotated and an electron beam is irradiated onto the specimen in an inclined manner.

According to another aspect of the present disclosure, there is provided a crystal structure analysis method comprising: measuring an overall structure of a crystal of a specimen by electron diffraction; measuring a local structure of the crystal by NMR measurement; and combining the overall structure and the local structure to specify a structure of the crystal.

According to another aspect of the present disclosure, the method may further comprise: optimizing the structure of the crystal by applying a quantum chemical calculation to the overall structure; and combining the optimized overall structure and the local structure.

According to another aspect of the present disclosure, the method may further comprise: measuring a distance between an atom X and a hydrogen atom in the crystal by measuring a dipole interaction between the atom X and the hydrogen atom by the NMR measurement; and specifying, in the combining process, a position of the hydrogen atom in the overall structure based on the distance.

According to another aspect of the present disclosure, the method may further comprise: executing a correlation measurement between an atom X and a hydrogen atom in the crystal by the NMR measurement; and judging, in the combining process, whether or not the hydrogen atom is bonded to the atom X based on the correlation measurement.

According to another aspect of the present disclosure, the method may further comprise: evaluating the overall structure by comparing a chemical shift tensor or an isotropic chemical shift of the crystal calculated by a quantum chemical calculation with a chemical shift tensor or an isotropic chemical shift of the crystal obtained by the NMR measurement.

According to the present disclosure, there can be provided a new analysis technique of a crystal structure which uses the electron diffraction method and the NMR measurement method.

BRIEF DESCRIPTION OF THE DRAWINGS

Embodiment(s) of the present disclosure will be described based on the following figures, wherein.

DESCRIPTION OF THE INVENTION

Figure 1:
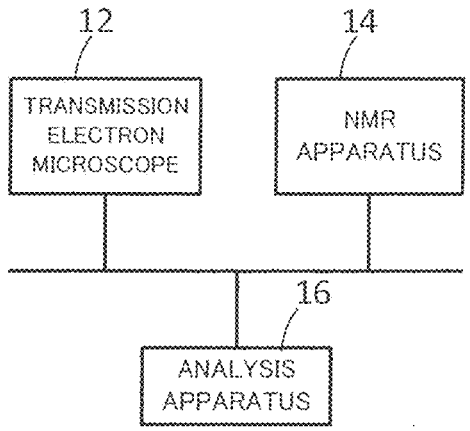
FIG. 1 is a block diagram showing a crystal structure analysis system according to an embodiment of the present disclosure.

A crystal structure analysis system according to an embodiment of the present disclosure will now be described with reference to FIG. 1. FIG. 1 shows an example of the crystal structure analysis system according to the present embodiment.

A crystal structure analysis system 10 according to the present embodiment comprises, as an example, a transmission electron microscope (TEM apparatus) 12, an NMR apparatus (nuclear magnetic resonance apparatus) 14, and an analysis apparatus 16. The transmission electron microscope 12, the NMR apparatus 14, and the analysis apparatus 16 are connected to each other by a communication path such as, for example, a network. For the transmission electron microscope 12 and the NMR apparatus 14, known apparatuses are used. The transmission electron microscope 12 corresponds to an example of an electron diffraction apparatus.

The transmission electron microscope 12 includes an electron gun, an electron lens, a deflection system, a specimen support base, an electron beam detector, and the like. An electron beam emitted from the electron gun is converged through the electron lens and the deflection system onto a specimen supported by the specimen support base, and is transmitted through the specimen. The electrons transmitting through the specimen are detected by the electron beam detector. A signal generated as a result of the detection is amplified and A/D converted, and is then transmitted to the analysis apparatus 16. Alternatively, an inclination of the specimen support base may be changed, to change a direction of irradiation of the electron beam irradiated onto the specimen. Alternatively, an angle of incidence of the electron beam to the specimen may be changed, to change the direction of irradiation of the electron beam. Further alternatively, both the inclination of the specimen support base and the angle of incidence of the electron beam may be changed. In the present embodiment, with the transmission electron microscope 12 executing the electron diffraction method, an overall structure of the crystal of the specimen is measured. The overall structure obtained herein has, as will be described later, an uncertainty, and it is not possible to specify one structure. This point will be described later in detail. As the electron diffraction method, for example, selected area electron diffraction (SAED), nano beam electron diffraction (NBD), convergent beam electron diffraction (CBED), or the like is executed. These methods are only exemplary, and other electron diffraction methods may be executed.

The NMR apparatus 14 is an apparatus which irradiates a high-frequency signal to the specimen placed in a static magnetic field, which detects a minute high-frequency signal emitted from the specimen thereafter (that is, an NMR signal), and which analyzes a molecular structure by extracting molecular structure information contained in the NMR signal. Various NMR parameters are obtained by the NMR apparatus 14, and these NMR parameters are transmitted to the analysis apparatus 16. In the present embodiment, by the NMR apparatus 14 executing the NMR measurement, a local structure of the crystal of the specimen is measured. According to the NMR measurement, a local structure in which the atom is present can be specified, but specifying the overall structure of the crystal is difficult. This point will be described later in detail.

The analysis apparatus 16 is an apparatus configured to determine a molecular structure of the crystal by combining the overall structure of the crystal measured by the electron diffraction by the transmission electron microscope 12, and the local structure of the crystal measured by the NMR apparatus 14. The analysis apparatus 16 may optimize and evaluate the crystal structure by executing, for example, a quantum chemical calculation based on the first principle. As the quantum chemical calculation, for example, a known calculation method is used. The analysis apparatus 16 is, for example, a computer including a processor such as a CPU (Central Processing Unit), a storage device such as a memory or a hard disk drive, and a user interface, or the like.

The user interface is formed by, for example, a display and an inputting device such as a keyboard. An analysis process by the analysis apparatus 16 is realized, as an example, by cooperation of hardware and software. For example, the analysis process by the analysis apparatus 16 is realized by the processor reading and executing a program stored in the storage device. As another example, the analysis process by the analysis apparatus 16 may be realized by hardware such as electronic circuits or an ASIC (Application Specific Integrated Circuit), or may be realized by a DSP (Digital Signal Processor) or an FPGA (Field Programmable Gate Array), or the like. Information showing the result of the analysis by the analysis apparatus 16 may be displayed on the display.

Figure 2:
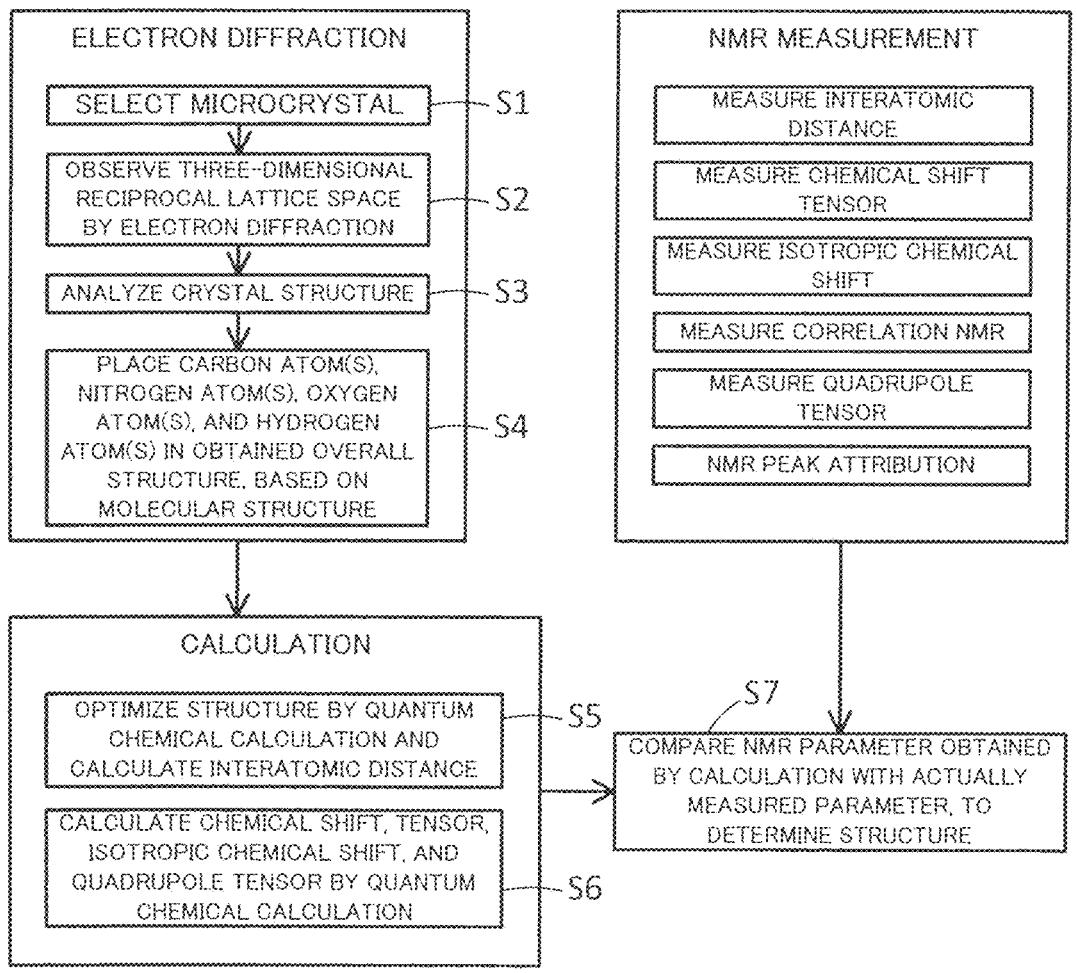
FIG. 2 is a diagram showing a flow of an analysis process according to an embodiment of the present disclosure.

An operation (crystal structure analysis method) of the crystal structure analysis system 10 will now be described in detail with reference to FIG. 2. FIG. 2 shows an example flow of a process executed by the crystal structure analysis system 10. In the present embodiment, generally, there are executed (1) specification of the overall structure by the electron diffraction, (2) collection of a parameter by the NMR measurement (specification of the local structure), and (3) optimization and evaluation of the structure by the quantum chemical calculation.

The process of (1) specification of the overall structure by the electron diffraction will now be described. First, a TEM image of the specimen is imaged by the transmission electron microscope 12. The TEM image is displayed, for example, on the analysis apparatus 16. A measuring person refers to a crystal shown in the TEM image, to select a microcrystal for which the structure is to be determined (step S1). Next, the electron diffraction method is applied to the microcrystal by the transmission electron microscope 12, to obtain a diffraction pattern showing an overall structure of the microcrystal, and the diffraction pattern is analyzed to obtain a three-dimensional reciprocal lattice (step S2). The analysis may be executed by the transmission electron microscope 12, or by the analysis apparatus 16.

The structure determination by the electron diffraction is re-constructed from the three-dimensional reciprocal lattice space. The reciprocal lattice is obtained from the diffraction pattern measured by the transmission electron microscope 12, by any of the following methods (a)~(d).

(a) The diffraction pattern is measured while the specimen is continuously rotated under irradiation of the electron beam.

(b) While a placement between the specimen and the electron beam is changed in various ways by rotating the specimen, inclining the electron beam, or by a combination of rotating the specimen and inclining the electron beam, the diffraction pattern is measured at each placement.

(c) While a placement between the specimen and the electron beam is changed in various ways by rotating the specimen, inclining the electron beam, or by a combination of rotating the specimen and inclining the electron beam, the electron beam is oscillated, precessed, or rotated at a small angle, and the diffraction pattern is measured.

(d) While the specimen is continuously rotated under irradiation of electron beam, the electron beam is oscillated, precessed, or rotated at a small angle, and the diffraction pattern is measured.

Then, for the three-dimensional reciprocal lattice obtained as described above, a known crystal structure analysis or a known structure optimization is applied (step S3). With this process, the overall structure of the microcrystal to be measured is obtained. For example, a potential map of the overall structure is obtained. For the method of obtaining the potential map from the three-dimensional reciprocal lattice, a known method may be used. The process of step S3 may be executed by the transmission electron microscope 12 or by the analysis apparatus 16.

Alternatively, a plurality of microcrystals may be selected in step S1, and the process of step S2 may be executed for each of the plurality of microcrystals.

Next, for the overall structure (for example, the potential map) obtained in step S3, carbon atom(s), nitrogen atom(s), oxygen atom(s), and hydrogen atom(s) are provisionally placed based on the molecular structure of the specimen (step S4). This placement may be automatically done by the analysis apparatus 16 or through a manual operation by the person conducting the measurement. Alternatively, known software which automatically executes the placement may be employed. Alternatively, the automatic placement process and the manual operation may be combined. For example, after the atoms are automatically placed by the automatic placement process, the placement of the atoms may be changed by the manual operation.

The structure obtained in the above-described manner has some uncertainties. For example, for an organic matter, elements having atomic numbers close to each other such as carbon atoms, nitrogen atoms, and oxygen atoms cannot be distinguished, and conformation of the molecule cannot be determined by one conformation. In addition, because the position of the hydrogen atom cannot be specified, the number of possible (that is, likely) structures is further increased. Therefore, according to the electron diffraction, a plurality of candidates may be generated for the overall structure of the microcrystal.

Alternatively, in the process of step S4, information of an interatomic distance obtained by the NMR measurement to be described later may be reflected in the placement process of the atoms, to place the atoms in the overall structure. For example, the analysis apparatus 16 places, in the overall structure (for example, the potential map), an atom X and an atom Y at a portion of the structure having a distance between the atoms X and Y, which is obtained by the NMR measurement.

The process of (2) collection of a parameter by NMR measurement (specification of the local structure) will now be described. With the NMR apparatus 14, an NMR parameter reflecting information of the local structure of the specimen is measured. As a solid-state NMR measurement, at least one measurement is executed among, for example, measurement of the interatomic distance by measurement of a dipole interaction, measurement of a chemical shift tensor, measurement of an isotropic chemical shift, correlation measurement, measurement of a quadrupole tensor, and measurement of an NMR peak position. Alternatively, NMR parameters other than these parameters may be measured. These NMR parameters are known to be very sensitive to the local structure in which the atom is present. In addition, by executing attribution of the NMR signal (that is, by determining from which atom each signal in the NMR spectrum is derived), it is possible to identify which NMR parameter contains local information of what position of the molecule. In addition, based on the attribution of the NMR signal and the local information, a likelihood of the overall structure obtained by the electron diffraction can be verified. The above-described analysis using the NMR signal is executed, for example, by the analysis apparatus 16. According to the solid-state NMR measurement, the local structure of the specimen can be obtained, but obtaining the overall structure of the specimen is difficult.

Alternatively, the analysis apparatus 16 may fit the attribution of the atom X obtained by the NMR measurement to the overall structure (for example, the potential map) obtained by the electron diffraction. As described above, because it is possible to identify which NMR parameter contains local information of what position of the molecule, for example, the analysis apparatus 16 may place the atoms in the overall structure using a result of the identification.

Alternatively, the NMR apparatus 14 may measure a distance between an atom X and a hydrogen atom by measuring a dipole interaction between the atom X and the hydrogen atom, and the analysis apparatus 16 may specify the position of the hydrogen atom in the overall structure (for example, the potential map) based on the distance.

Alternatively, the NMR apparatus 14 may execute correlation measurement between an atom X and a hydrogen atom, and based on a result of the correlation measurement the analysis apparatus 16 may judge whether or not the hydrogen atom is bonded to the atom X.

The atom X is not particularly limited, and may even be a hydrogen atom.

The process of (3) optimization of the structure by the quantum chemical calculation will now be described. The information showing the measurement result of the electron diffraction by the transmission electron microscope 12, and the information showing the result of the solid-state NMR measurement by the NMR apparatus 14 are output to the analysis apparatus 16. The analysis apparatus 16 applies the quantum chemical calculation to one or a plurality of candidates of the overall structure obtained by the electron diffraction, to optimize each candidate of the overall structure (step S5). The analysis apparatus 16 may calculate the interatomic distance for each candidate by applying the quantum chemical calculation to each candidate of the overall structure. In addition, the analysis apparatus 16 applies the quantum chemical calculation to each candidate of the overall structure, to calculate an NMR parameter for each candidate (step S6). The NMR parameter calculated in this process is at least one of the plurality of NMR parameters described above.

Next, the analysis apparatus 16 compares the NMR parameter obtained by the calculation and the NMR parameter measured by the NMR apparatus 14 (that is, an actually measured parameter), to evaluate the likelihood of the overall structure for each candidate, and determines a final structure based on a result of the evaluation (step S7).

In some cases, one crystal structure may be specified from among a plurality of candidates by the process of step S5 (optimization of the overall structure). In this case, the process of step S6 (calculation of the NMR parameter) and the process of step S7 (comparison process) do not need to be executed. For example, the processes of steps S6 and S7 may be executed when a plurality of candidates of the overall structure are generated by the processes of steps S1~S4, and one crystal structure is not specified in the process of step S5. Similarly, in some cases, one crystal structure may be specified from among the plurality of candidates by the comparison result between the NMR parameter obtained by the process of step S6 and the actually measured value of the NMR parameter measured by the NMR apparatus 14. In this case, the process of step S5 (optimization of the overall structure) does not need to be executed.

EXAMPLE

An Example will now be described. As an example, a structure of an orthorhombic L-histidine (specimen of the present Example) is to be determined.

Figure 3:
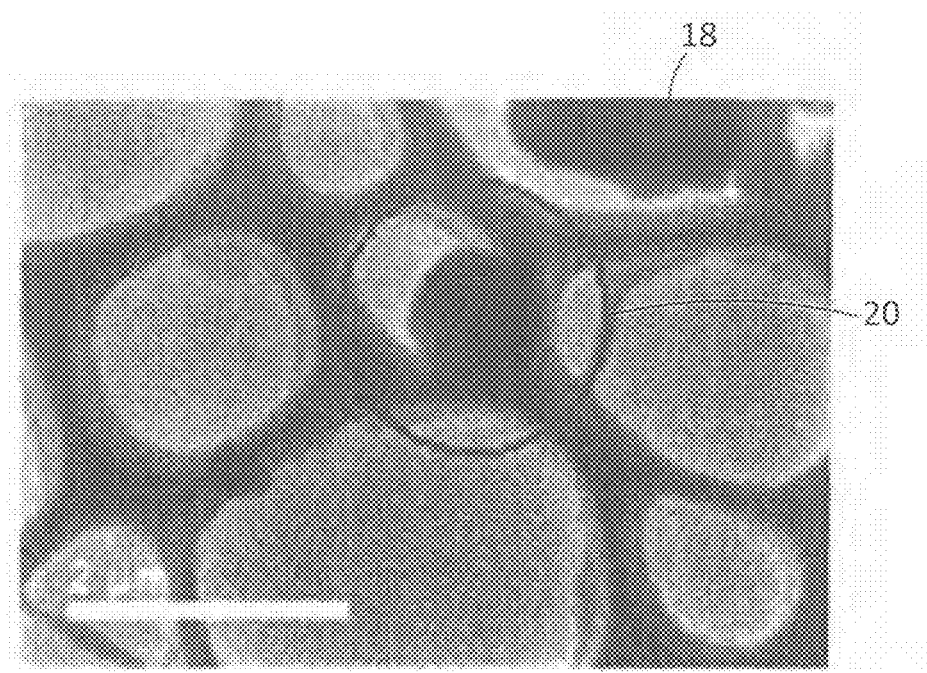
FIG. 3 is a diagram showing a TEM (Transmission Electron Microscope) image of a specimen.
Figure 4:
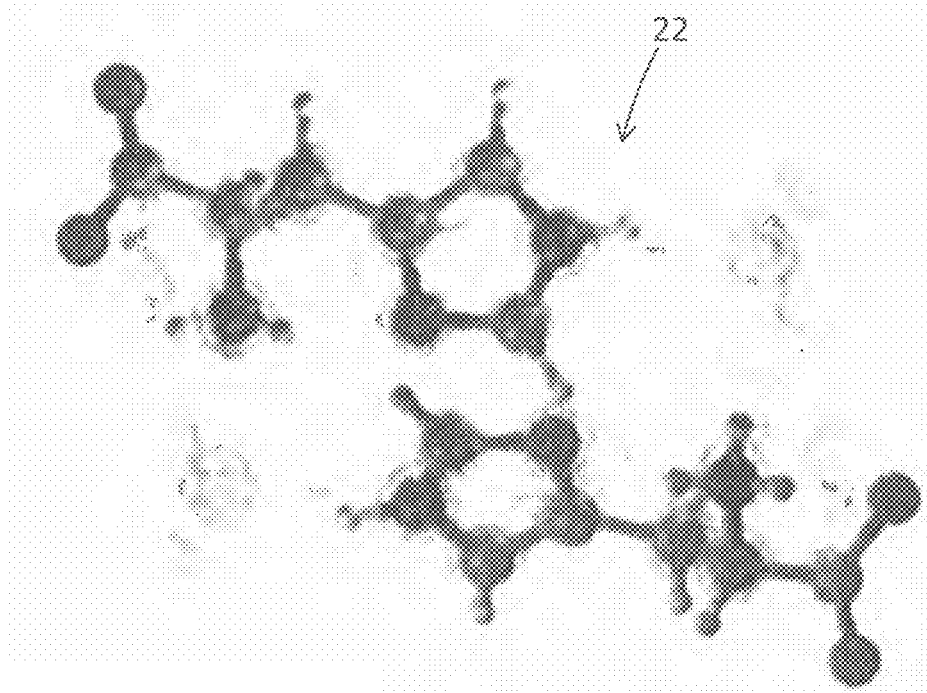
FIG. 4 is a diagram showing a potential map of a specimen.

First, a TEM image of the specimen was imaged by the transmission electron microscope 12. FIG. 3 shows the TEM image 18. The person conducting the measurement observes the TEM image, and selects the microcrystal to be a target of the specifying process of the crystal structure. For example, a microcrystal of a portion shown by a circle 20 in the TEM image 18 was selected. The microcrystal had a size of about 1 μm. The electron beam was irradiated to the microcrystal by the transmission electron microscope 12, and, while the specimen was continuously rotated, a sequence of diffraction patterns were obtained. Here, a three-dimensional reciprocal lattice was obtained by analyzing five diffraction patterns from the crystal. With the direct method, the structure analysis was executed based on the three-dimensional reciprocal lattice, and a potential map 22 as shown in FIG. 4 was obtained. These analyses are executed by, for example, the analysis apparatus 16.

Figure 5:
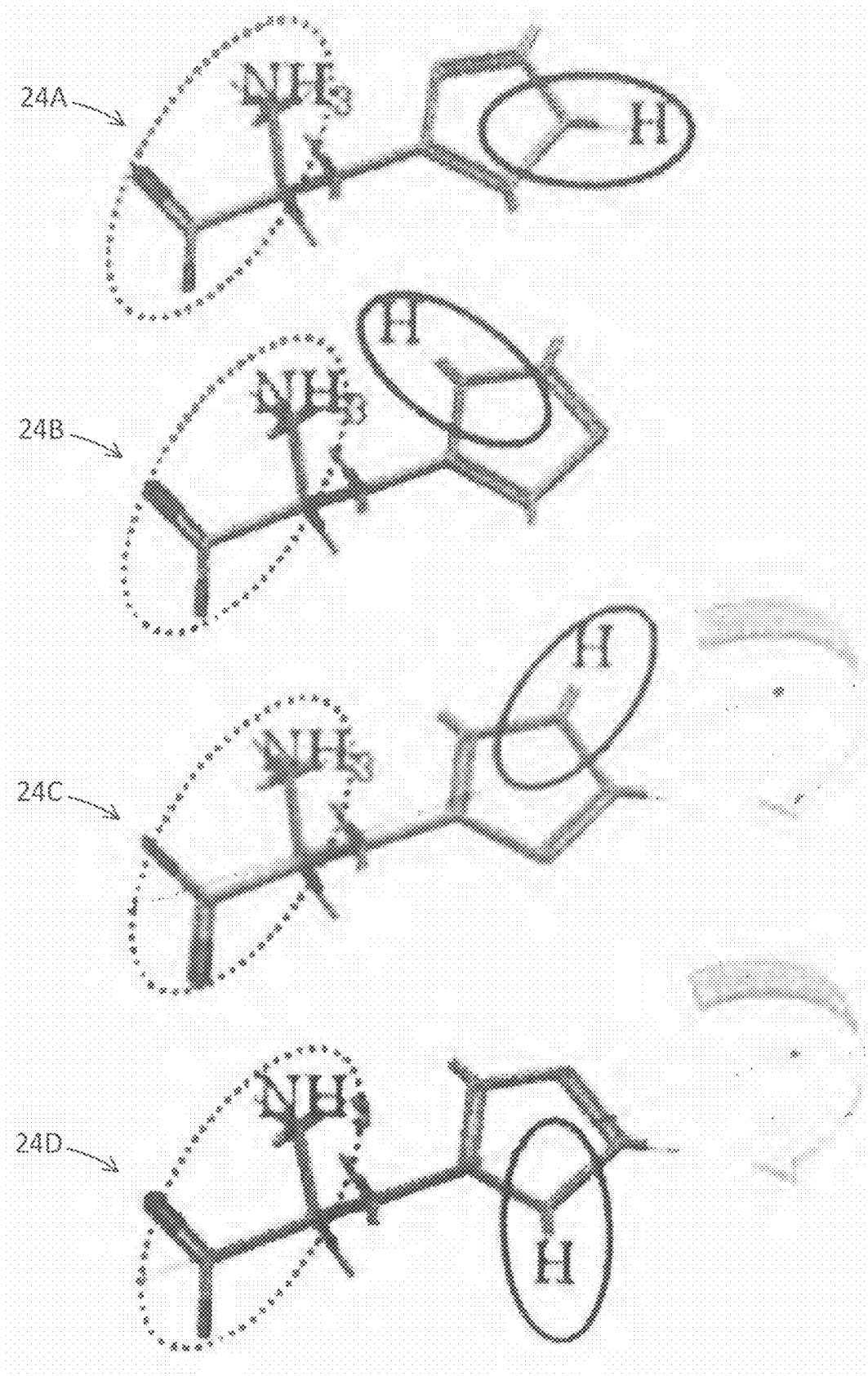
FIG. 5 is a diagram showing an example conformation of a specimen.
Figure 6:
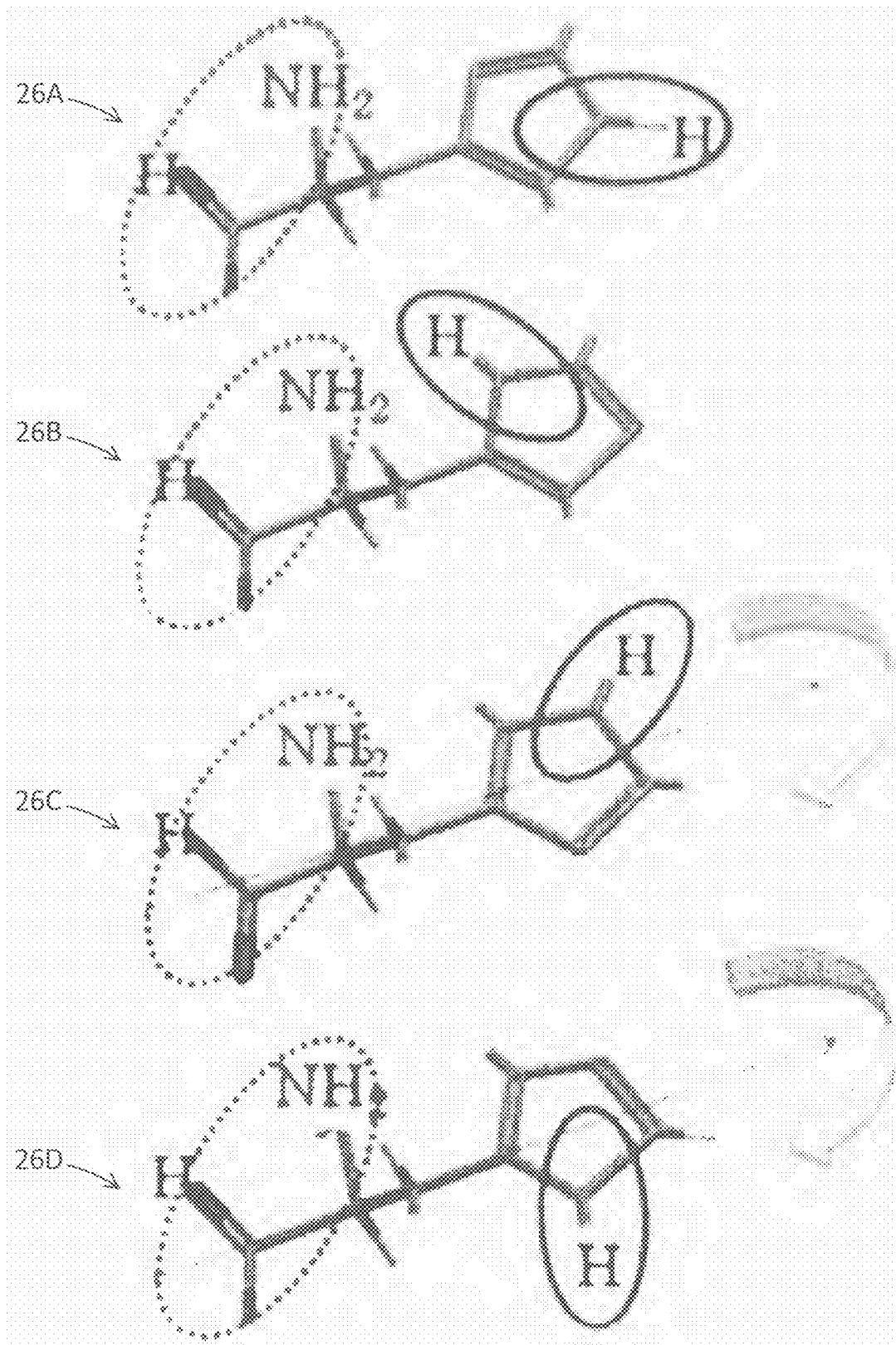
FIG. 6 is a diagram showing an example conformation of a specimen.
Figure 7:
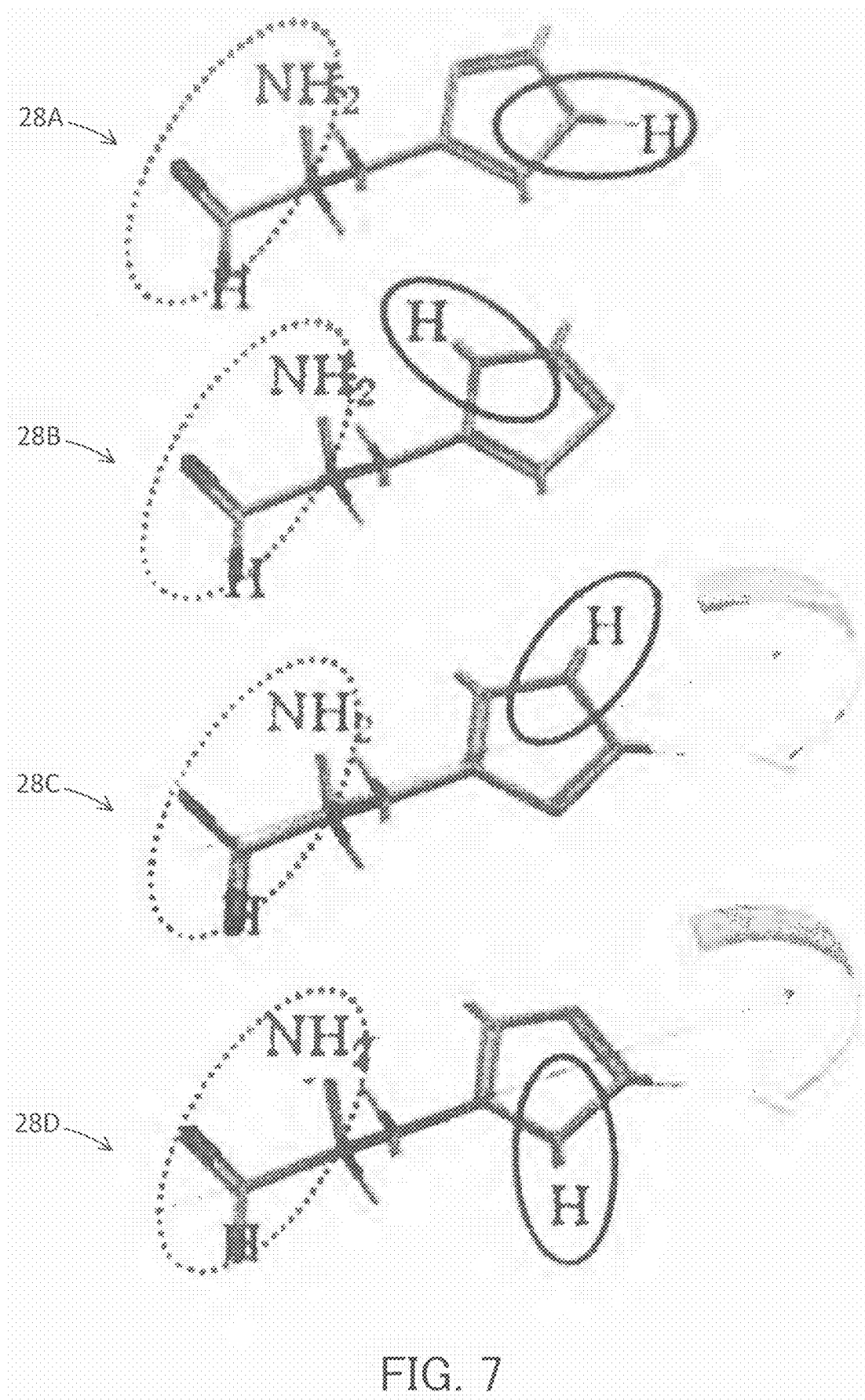
FIG. 7 is a diagram showing an example conformation of a specimen.

Even if the molecule is overlapped on the potential map 22, the position of the hydrogen atom cannot be determined. Because of the ambiguity that the carbon atom, the nitrogen atom, and the oxygen atom cannot be distinguished from each other, based on the electron diffraction, 12 conformations shown in FIGS. 5 to 7 are equally likely. FIGS. 5 to 7 show conformations obtained from the electron diffraction. FIG. 5 shows conformations 24A~24D, FIG. 6 shows conformations 26A~26D, and FIG. 7 shows conformations 28A~28D. As it cannot be specified to which of two nitrogen atoms included in an imidazole ring the hydrogen atom is bonded, all of the structures are likely. Therefore, as candidates for the structure in relation to this point, two conformations (that is, two choices) are possible. In addition, because two orientations can be taken as the orientation of the imidazole ring, as candidates for the structure in relation to this point, two conformations (that is, two choices) are possible. Further, because it cannot be specified whether or not the specimen is Zwitterion (dipolar ion), as candidates for the structure in relation to this point, three conformations (that is, three choices) are possible. Thus, a total of 12 (=2×2×3) conformations are specified as a likely overall structure based on the electron diffraction, and one structure cannot be determined. The overlapping of the molecule may be executed by the analysis apparatus 16 or by the person conducting measurement.

Next, the NMR parameter of the specimen was measured by the NMR apparatus 14. Here, a 1H/14N correlation NMR measurement was executed. With this measurement, it was found that the orthorhombic L-histidine was a Zwitterion, and the hydrogen atom is bonded to only one of the two nitrogen atoms included in the imidazole ring (refer to Acta Cryst. (2017), C73, 219 228). This can be derived from the facts that only two signals were observed in the 1H/14N correlation spectrum (that is, the hydrogen atom is bonded to one of the two nitrogen atoms included in the imidazole ring and the hydrogen atom is not bonded to the other nitrogen atom), and that one of the 1H/14N peaks was observed near 14N:−250 ppm (that is, one of the peaks became NH3+, the quadrupole constant of 14N was reduced, and the shift was reduced). Based on this, of the 12 conformations described above, the possibility of the conformations 26A~26D and 28A~28D can be eliminated, and the candidates for the structure can be narrowed to four structures of the conformations 24A~24D. In addition, measurement of the isotropic chemical shift of 1H, 13C, and 14N, and measurement of the interatomic distance between 1H and 15N were executed. The order of the electron diffraction and the NMR measurement is not particularly limited, and one of these processes may be executed before the other, or both processes may be executed at the same timing.

Next, optimization of the structure and evaluation were executed by the quantum chemical calculation. For the conformations 24A~24D, the interatomic distance between 1H and 15N obtained by the solid-state NMR measurement was applied, to select a conformation having the interatomic distance obtained by the solid-state NMR measurement. This process may be executed by the analysis apparatus 16 or by the person conducting measurement. In addition, the quantum chemical calculation was applied to the conformations 24A~24D, to calculate energy and chemical shift for each of the conformations 24A~24D. The chemical shift obtained by the calculation and the chemical shift obtained by the solid-state NMR measurement were compared to each other, and RMSDs (Root Mean Square Deviation) of these chemical shifts were calculated. The calculations were executed by the analysis apparatus 16.

Figure 8:
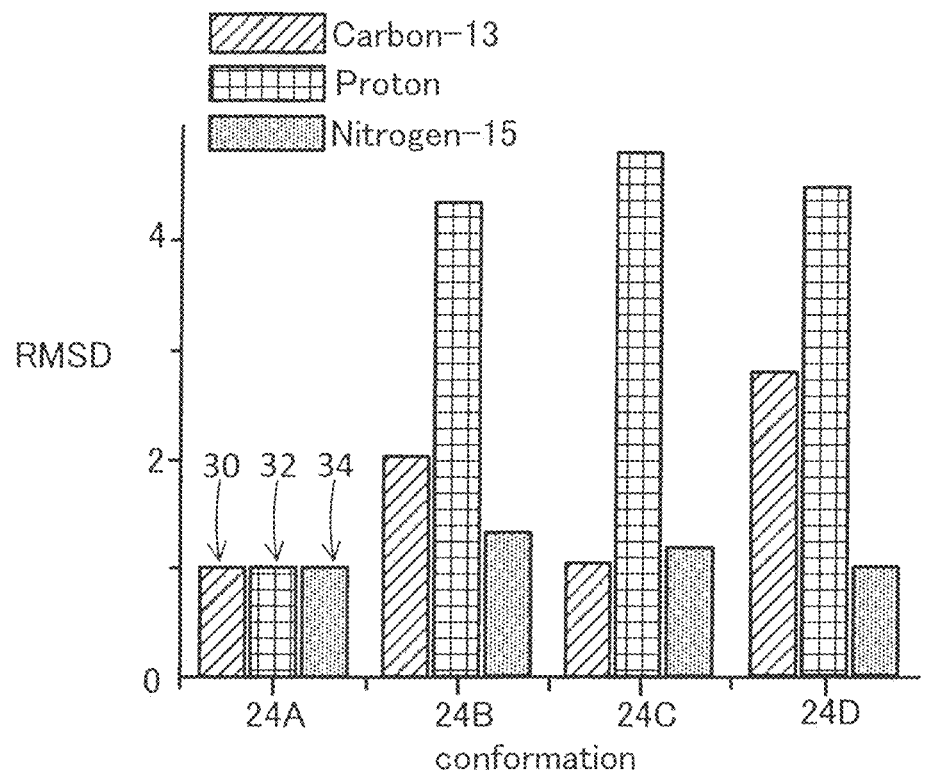
FIG. 8 is a diagram showing a result of comparison of a chemical shift obtained by calculation and an actually measured chemical shift.
Figure 9:
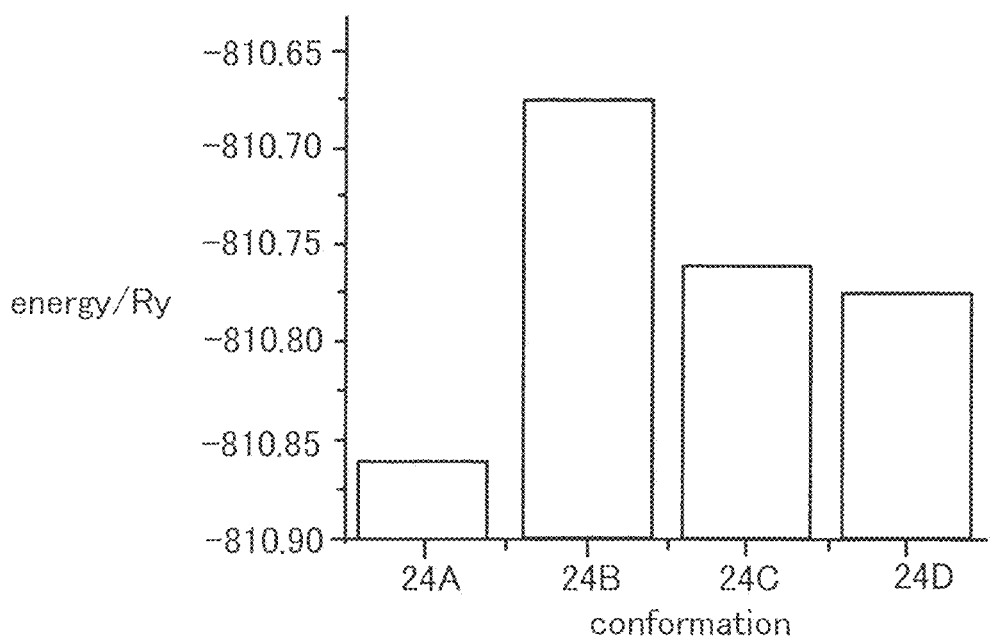
FIG. 9 is a diagram showing energy obtained by calculation.

FIG. 8 shows the RMSD of the chemical shift for each conformation. FIG. 9 shows the calculated energy of each conformation. In FIG. 8, a horizontal axis shows the conformation, and a vertical axis shows the calculated RMSD. In FIG. 9, a horizontal axis shows the conformation, and a vertical axis shows the calculated energy.

FIG. 8 shows the RMSD of the chemical shift for 13C, the RMSD of the chemical shift for 1H (proton), and the RMSD of the chemical shift for 15N. For example, reference numerals 30, 32, and 34 show RMSDs of the chemical shift for the conformation 24A. Reference numeral 30 shows the RMSD of the chemical shift for 13C, reference numeral 32 shows the RMSD of the chemical shift for 1H, and reference numeral 34 shows the RMSD of the chemical shift for 15N. Similarly, for the conformations 24B~24D, the RMSDs of the chemical shifts are shown in the order of 13C, 1H, and 15N, from the left.

Referring to FIG. 8, in all of 1H (proton), 13C, and 15N, the RMSD of the conformation 24A is smaller than the RMSDs of the other conformations. This indicates that the conformation 24A is the most likely structure. Referring to FIG. 9, the energy of the conformation 24A is smaller than the energies of the other conformations. This indicates that the conformation 24A is the most stable structure. Moreover, the distance between 1H and 15N obtained by the quantum chemical calculation for the conformation 24A closely matches the distance obtained by the solid-state NMR measurement (that is, the actual measured value). According to the evaluation described above, the conformation 24A is specified as the most likely structure of the specimen. The comparison of the RMSD, the comparison of the energy, the comparison of the interatomic distance, and the determination of the most likely structure may be executed by the analysis apparatus 16 or by the person conducting measurement. For example, the graph of RMSD (FIG. 8) and the graph of the energy (FIG. 9) may be generated by the analysis apparatus 16 and displayed on the display, and the person conducting measurement may specify the most likely structure by referring to these graphs.

As described, it was possible to specify the structure of the orthorhombic L-histidine (specimen of the present Example) by combining the electron diffraction, the solid-state NMR measurement, and the quantum chemical calculation.

In the Example described above, the quantum chemical calculation is used. However, when it is possible to determine the structure by the combination of the electron diffraction and the solid-state NMR measurement, the quantum chemical calculation does not need to be employed. For example, in a case where one conformation can be determined from among a plurality of conformations obtained by the electron diffraction, using a plurality of NMR parameters (actually measured values) obtained by the NMR measurement, the quantum chemical calculation does not need to be executed. Depending on the structure of the specimen, the most likely structure can be specified by the position of the hydrogen atom, and the NMR parameters such as the position of the NMR peak and the chemical shift, and, in this case, the quantum chemical calculation is not necessary.

According to the present embodiment, the crystal structure can be specified even for a crystal having a size of less than or equal to 1 μm. Therefore, the crystal structure can be specified even for a specimen for which creating a large crystal is difficult.

Depending on a thickness of the specimen, it may be difficult for the electron beam to transmit through the specimen. In this case, a specimen with a thin thickness may be used so that the electron beam can easily transmit through the specimen. For example, for a specimen having a thickness of greater than or equal to 3 μm, it may be difficult for the electron beam to transmit through, in which case a thinner specimen may be used.

As described, according to the present embodiment, the overall structure of a minute crystal having a size of less than or equal to 1 μm can be specified by applying the electron diffraction method. This is because, as the interaction of the electron beam is significantly stronger than the interaction of the X-ray, a diffraction pattern can be obtained even from such a very small microcrystal. In addition, by using the solid-state NMR measurement (and quantum chemical calculation as necessary), the position of the hydrogen atom which cannot be specified by the electron diffraction can be specified. In addition, by using the solid-state NMR measurement (and the quantum chemical calculation as necessary), elements having atomic numbers close to each other and which cannot be distinguished by the electron diffraction (in the Example, the carbon atom, the nitrogen atom, and the oxygen atom) can be distinguished. Further, by combining the electron diffraction, the solid-state NMR measurement, and the quantum chemical calculation, the structure of the small crystal can be optimized. Moreover, even for a specimen including impurities, a small monocrystal may be selected from the specimen, and the selected monocrystal may be analyzed, to specify the structure thereof.

In the Example describe above, the orthorhombic L-histidine was used as the specimen, but this is only exemplary, and, even for other specimens, the most likely crystal structure can be specified by the combination of the electron diffraction and the NMR measurement or by the combination of the electron diffraction, the NMR measurement, and the quantum chemical calculation.

For example, specimens having a high crystallinity such as an MOF (metal organic framework), specimens for which creating a large monocrystal is difficult, and specimens having impurities such as tablets of a pharmaceutical drug may be employed as the specimen of the present embodiment. The crystal structure of these specimen cannot be specified by the powder X-ray diffraction method or the microcrystalline X-ray diffraction method of the related art, but according to the present embodiment, the crystal structure of these specimen can be specified.

The invention claimed is:

1. A crystal structure analysis system comprising:
   an electron diffraction apparatus that measures an overall structure of a crystal of a specimen by electron diffraction;
   a nuclear magnetic resonance (NMR) apparatus that measures a local structure of the crystal by NMR measurement; and
   an analysis apparatus that combines the overall structure and the local structure to specify a structure of the crystal,
   wherein the analysis apparatus further optimizes the structure of the crystal by applying a quantum chemical calculation to the overall structure to obtain an optimized overall structure, and combines the optimized overall structure and the local structure.

2. The crystal structure analysis system according to claim 1, wherein
   the analysis apparatus fits, in the combining process, an attribution of an atom X obtained by the NMR measurement to a potential map of the crystal obtained by the electron diffraction.

3. The crystal structure analysis system according to claim 1, wherein
   the NMR apparatus measures a distance between an atom X and a hydrogen atom in the crystal by measuring a dipole interaction between the atom X and the hydrogen atom by the NMR measurement, and
   the analysis apparatus specifies, in the combining process, a position of the hydrogen atom in the overall structure based on the distance.

4. The crystal structure analysis apparatus according to claim 1, wherein
   the NMR apparatus executes a correlation measurement between an atom X and a hydrogen atom in the crystal by the NMR measurement, and
   the analysis apparatus judges, in the combining process, whether the hydrogen atom is bonded to the atom X based on a result of the correlation measurement.

5. The crystal structure analysis system according to claim 1, wherein
   the analysis apparatus further evaluates the overall structure measured by the electron diffraction based on a chemical shift tensor or an isotropic chemical shift of the crystal obtained by the NMR measurement.

6. The crystal structure analysis system according to claim 5, wherein
   the analysis apparatus evaluates the overall structure by comparing a chemical shift tensor or an isotropic chemical shift of the crystal calculated by a quantum chemical calculation with a chemical shift tensor or an isotropic chemical shift of the crystal obtained by the NMR measurement.

7. The crystal structure analysis system according to claim 5, wherein
   when a plurality of structures are deduced by the combining process, the analysis apparatus evaluates the overall structure.

8. The crystal structure analysis system according to claim 1, wherein
the analysis apparatus further specifies the overall structure by re-constructing a three-dimensional reciprocal lattice space of the crystal obtained by the electron diffraction.

9. The crystal structure analysis system according to claim 8, wherein
the electron diffraction apparatus executes measurement by the electron diffraction while the specimen is rotated.

10. The crystal structure analysis apparatus according to claim 8, wherein
the electron diffraction apparatus executes measurement by the electron diffraction while the specimen is rotated and an electron beam is irradiated onto the specimen in an inclined manner.

11. A crystal structure analysis method comprising:
measuring an overall structure of a crystal of a specimen by electron diffraction;
measuring a local structure of the crystal by NMR measurement;
optimizing the structure of the crystal by applying a quantum chemical calculation to the overall structure to obtain an optimized overall structure; and
combining the optimized overall structure and the local structure to specify a structure of the crystal.

12. The crystal structure analysis method according to claim 11, further comprising:
measuring a distance between an atom X and a hydrogen atom in the crystal by measuring a dipole interaction between the atom X and the hydrogen atom by the NMR measurement; and
specifying, in the combining process, a position of the hydrogen atom in the overall structure based on the distance.

13. The crystal structure analysis method according to claim 11, further comprising:
executing a correlation measurement between an atom X and a hydrogen atom in the crystal by the NMR measurement; and
judging, in the combining process, whether or not the hydrogen atom is bonded to the atom X, based on the correlation measurement.

14. The crystal structure analysis method according to claim 11, further comprising:
evaluating the overall structure by comparing a chemical shift tensor or an isotropic chemical shift of the crystal calculated by a quantum chemical calculation with a chemical shift tensor or an isotropic chemical shift of the crystal obtained by the NMR measurement.

* * * * *